(12) United States Patent
Zait et al.

(10) Patent No.: US 7,680,761 B2
(45) Date of Patent: Mar. 16, 2010

(54) METHOD AND MECHANISM FOR DATABASE PARTITIONING

(75) Inventors: Mohamed Zait, Sunnyvale, CA (US); Benoit Dageville, Redwood Shores, CA (US)

(73) Assignee: Oracle International Corporation, Redwood Shores, CA (US)

( * ) Notice: Subject to any disclaimer, the term of this patent is extended or adjusted under 35 U.S.C. 154(b) by 828 days.

(21) Appl. No.: 10/952,390

(22) Filed: Sep. 27, 2004

(65) Prior Publication Data

US 2005/0038784 A1 Feb. 17, 2005

Related U.S. Application Data

(63) Continuation of application No. 09/796,001, filed on Feb. 27, 2001, now Pat. No. 6,931,390.

(51) Int. Cl.
*G06F 17/30* (2006.01)
(52) U.S. Cl. .............. 707/2; 707/3; 707/8; 707/10; 707/100; 707/200; 382/201; 382/203; 709/224; 709/201; 709/202; 709/203; 709/204
(58) Field of Classification Search ............ 707/2, 707/102, 3, 8, 10, 100, 200; 382/201, 203; 709/224, 201, 202, 203, 204
See application file for complete search history.

(56) References Cited

U.S. PATENT DOCUMENTS

| | | | | |
|---|---|---|---|---|
| 5,590,319 A | * | 12/1996 | Cohen et al. | 707/4 |
| 5,734,893 A | * | 3/1998 | Li et al. | 707/4 |
| 5,832,496 A | * | 11/1998 | Anand et al. | 707/102 |
| 5,848,408 A | | 12/1998 | Jakobsson et al. | |
| 6,092,062 A | * | 7/2000 | Lohman et al. | 707/2 |
| 6,105,020 A | * | 8/2000 | Lindsay et al. | 707/2 |
| 6,161,105 A | * | 12/2000 | Keighan et al. | 707/100 |
| 6,292,830 B1 | * | 9/2001 | Taylor et al. | 709/224 |
| 6,405,198 B1 | * | 6/2002 | Bitar et al. | 707/6 |
| 6,408,292 B1 | * | 6/2002 | Bakalash et al. | 707/2 |
| 6,415,297 B1 | * | 7/2002 | Leymann et al. | 707/201 |
| 6,931,390 B1 | * | 8/2005 | Zait et al. | 707/2 |
| 2002/0035559 A1 | * | 3/2002 | Crowe et al. | 707/2 |

* cited by examiner

*Primary Examiner*—Isaac M Woo
*Assistant Examiner*—SyLing Yen
(74) *Attorney, Agent, or Firm*—Vista IP Law Group, LLP.

(57) ABSTRACT

The present invention is directed to a method and mechanism for partitioning using information not directly located in the object being partitioned. According to an embodiment of the invention, foreign key-primary key relationships are utilized to create join conditions between multiple database tables to implement partitioning of a database object. Also, disclosed are methods and mechanisms to perform partition pruning.

26 Claims, 9 Drawing Sheets

Sales Table

| Sale_id | Store_id | Product_id | Sale_amount | Time_id |
|---|---|---|---|---|
| 50 | 1000 | 1001 | $100 | 5 |
| 100 | 2000 | 1051 | $500 | 10 |
| 150 | 1000 | 1100 | $50 | 15 |
| 200 | 3000 | 1051 | $2000 | 20 |
| 250 | 4000 | 1100 | $50 | 25 |
| 300 | 2000 | 1001 | $200 | 30 |

FIG. 1a

METHOD AND MECHANISM FOR DATABASE PARTITIONING

CROSS REFERENCED AND RELATED APPLICATIONS

This application is a continuation of U.S. application Ser. No. 09/796,001 entitled "Method and Mechanism for Database Partitioning" filed on Feb. 27, 2001 now U.S. Pat. No. 6,931,390. This case is related to co-pending U.S. application Ser. No. 09/795,904 entitled "Method and Mechanism for Partition Pruning" filed on Feb. 27, 2001. These applications are hereby incorporated by reference as if fully set forth herein.

BACKGROUND AND SUMMARY

The invention relates to computer systems, and more particularly, to a method and mechanism for partitioning in a database system. Partitioning in a database system generally refers to the process of decomposing an object into a greater number of relatively smaller objects. Smaller objects are often easier to manage and more efficient to search than larger objects. Thus, database systems utilize partitioning to decompose objects such as tables and indexes into smaller and more manageable pieces or "partitions."

Referring to FIG. 1a, a Sales Table 100 is shown containing a sample set of sales figures for a company. Each row contains a distinctive sales_id value (column 122) to uniquely reference a sale, as well as a store_id value (column 124) containing the system identification number of the store in which the sale was made, a product_id value (column 126) containing the system identification number of the product sold, a sales amount for the sale (column 128), and a time_id value (column 130) containing the system identification number for the date of the sale. Consider if it is desired to maintain this table as three separate partitions based upon the value in the "sales_amount" column 128. In particular, assume it is desired to form a first partition for all sales data corresponding to sales amount between $1 and $100, a second partition corresponding to all sales amounts between $101 and $1000, and a third partition corresponding to all sales amounts between $1001 and $2000.

The following Structured Query Language ("SQL") statement can be used to create this partitioned table as three separate partitions (using the Oracle 8i database system available from Oracle Corporation of Redwood Shores, Calif.):

```
CREATE TABLE Sales (    sale_id        INTEGER,
                        store_id       INTEGER,
                        product_id     INTEGER,
                        sales_amount   NUMBER(10),
                        time_id        INTEGER )
PARTITION BY RANGE ( sales_amount )
   (PARTITION p0 VALUES LESS THAN (101) TABLESPACE TS0,
    PARTITION p1 VALUES LESS THAN (1001) TABLESPACE TS1,
    PARTITION p2 VALUES LESS THAN (2001) TABLESPACE TS2 );
```

FIG. 1b shows the three resulting partitions P0, P1, and P2 for the information logically contained in Sales Table 100. Partition P0 contains all rows in Sales Table 100 which has a sales_amount value less than $101 (rows 102, 106, and 110), partition P1 contains all rows having a sales_amount value from $101 to $1000 (rows 104 and 112), and partition P2 contains all rows having a sales_amount value from $1001 to $2000 (row 108).

Several advantages exist once a data object has been partitioned. As just one example, "partition pruning" can be used to more efficiently execute a query upon a partitioned table. If a database query is issued against a table and the query contains a search term that is limited by a certain range or value corresponding to a partitioning criteria, then only partitions having the desired range or value are searched; all other partitions outside the desired range are "pruned" from the search. If it is desired to search for all entries in the Sales Table 100 that have a sales amount between $1-50, then only partition P0 needs to be searched to satisfy the query. Partitions P1 and P2 contain entries that are clearly outside of the desired range; thus, they can be pruned from the search. Compared to non-partitioned tables, this type of partition pruning significantly reduces the volume of data that must be searched, thereby decreasing the response time and reducing the expense/overhead of responding to the query.

The present invention includes a method and mechanism for partitioning using information not directly located in the object being partitioned. According to an embodiment of the invention, foreign key-primary key relationships are utilized to create join conditions between multiple database tables to implement partitioning of a database object. Also disclosed are methods and mechanisms to perform partition pruning.

Further details of aspects, objects, and advantages of the invention are described below in the detailed description, drawings, and claims.

BRIEF DESCRIPTION OF THE DRAWINGS

The accompanying drawings are included to provide a further understanding of the invention and, together with the Detailed Description, serve to explain the principles of the invention.

FIG. 1a represents an example of a Sales "fact" table.

FIG. 2 represents examples of "dimension" tables corresponding to the table of FIG. 1a.

DETAILED DESCRIPTION

An aspect of the present invention is directed to a method and mechanism for partitioning using information not directly located in the object being partitioned. In the following description, for the purposes of explanation, one or more embodiments having specific combinations of elements and/or process actions are set forth in order to provide a thorough understanding of the present invention. It will be apparent, however, to one skilled in the art that the present invention may be practiced without these specific combinations or order of elements/process actions. For example, the present explanation of the invention is made with reference to a "star schema", in which a central table, referred to as a fact table, is connected to one or more other tables, called dimension tables, through foreign key-primary key relationship(s). However, it is noted that the present invention may equally be applied to other data arrangements that store partitioning information external to the object being partitioned. In addition, the present invention is not restricted to tables and may be applied to partition any data object, e.g., indexes and materialized views.

In relational database systems, a star schema is utilized to organize information such that a fact table contains primary information relevant to the table as well as references (foreign key values) to corresponding rows in one or more dimension tables. Rather than storing or duplicating information that already exists in the dimension tables, the foreign key values reference the appropriate row in a dimension table containing the more detailed information relevant to a row in the fact table. The "lookup" process to match a row in the fact table with a corresponding row in a dimension table is performed by matching a foreign key value in the fact table with a primary key value in a dimension table.

Figure 1B:
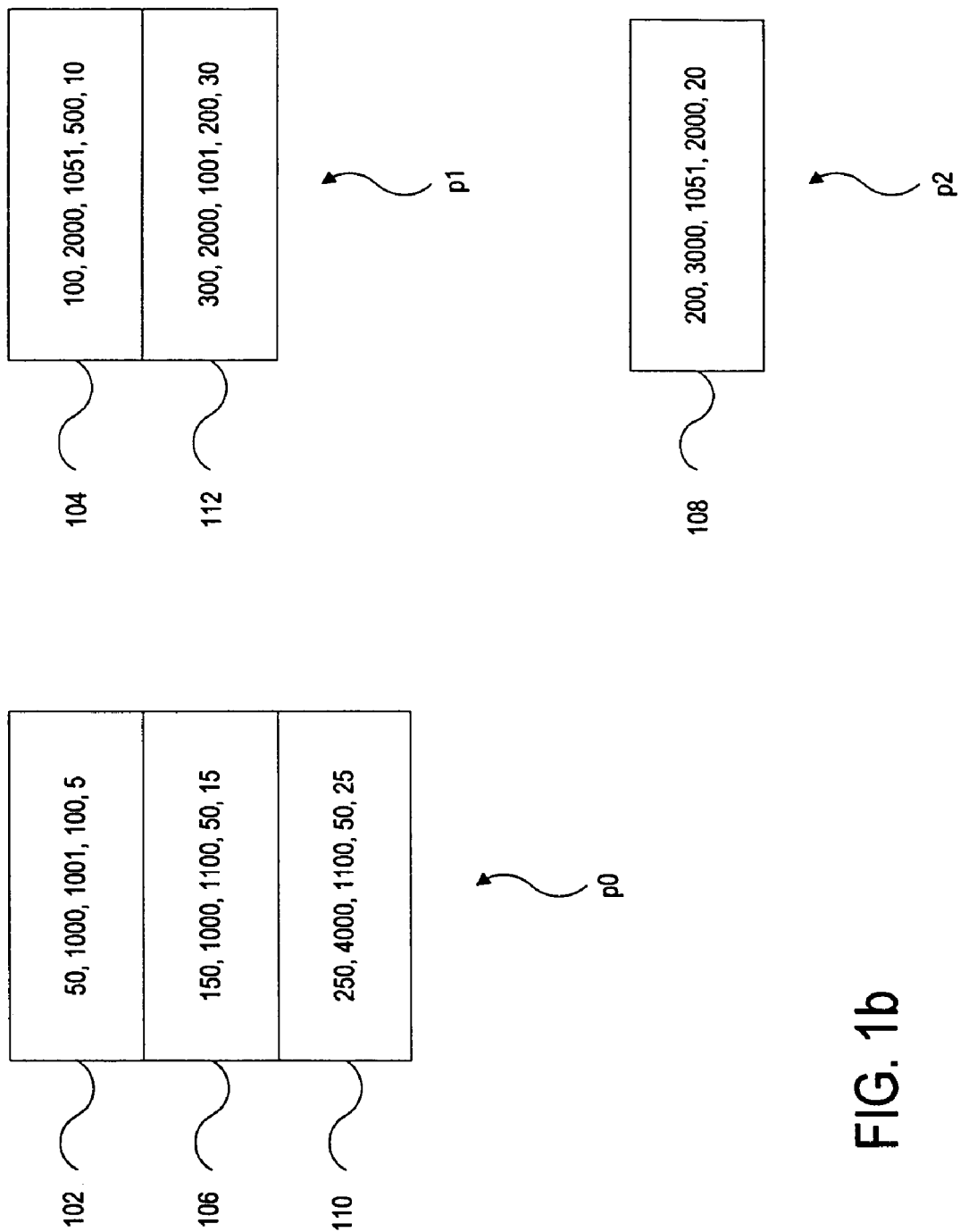
FIG. 1b shows the Sales Table of FIG. 1a as three separate partitions.

To illustrate the organization of star schemas, reference is made back to the Sales Table 100 of FIG. 1a. Sales Table 100 is an example of a fact table having a number of attributes, which can be represented by the following (with the table attributes in the parenthesis):

Sales (sales_id, stored_id, product_id, sales_amount, time_id)

In this example, the store_id, product_id, and time_id values represent foreign keys that reference more detailed information in dimension tables. The following are examples of table representations for dimension tables corresponding to the store_id, product_id, and time_id values, with column names listed in the parenthesis:

Store (store_id, city, state)

Product (product_id, product_name, product_category)

Time (time_id, date, quarter)

Figure 2:
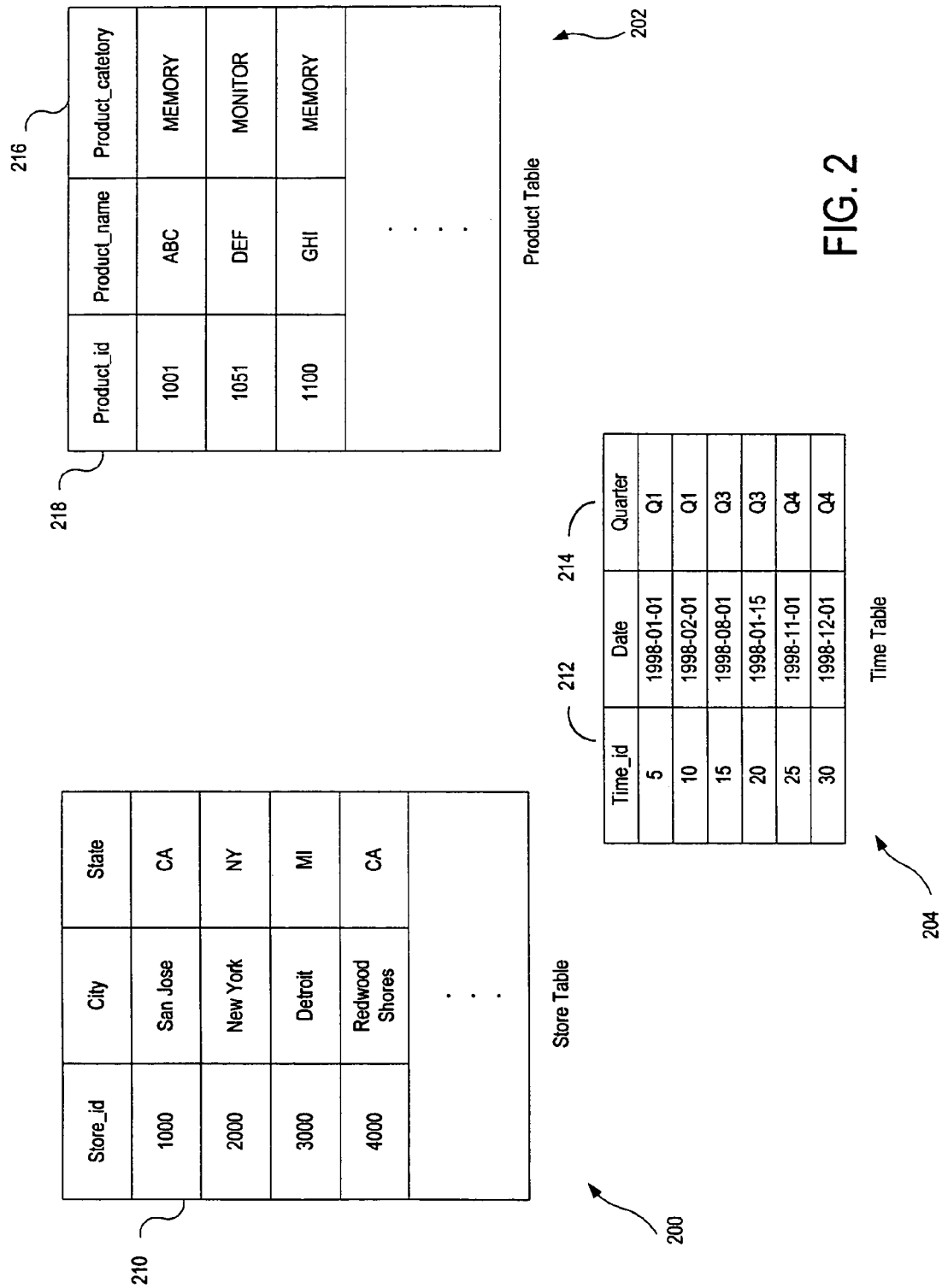

Each of these tables is illustrated with sample data values in FIG. 2 (i.e., Store Table 200, Product Table 202, and Time Table 204).

Detailed address information for the individual stores are located in the Store Table 200 rather than having that information listed in each row of the Sales Table 100. One reason to utilize this structure is that the number of sales transactions recorded in a Sales Table 100 could be much greater than the number of stores engaging in the sales transactions. Thus, storing address information in each row of the Sales Table 100 could result in many duplicative entries of the same information. To illustrate, note that row 102 of the Sales Table 100 includes the value "1000" in the store_id column 124. Row 106 of the Sales Table 100 has the same value in its store_id column 124. Rather than storing the same detailed information for the corresponding store in both rows, that information is placed in the Store dimension table 200. To obtain detailed address information for the store having this store_id value, the dimension table corresponding to this foreign key value (i.e., the Store Table 200) is searched for a row having a primary key with the same value. This is found at row 210 of Store table 200. Thus, it is seen that "San Jose, Calif." is the address for the store making the sales referenced in both rows 102 and 104 of Sales Table 100.

In a similar manner, Product Table 202 and Time Table 204 are additional dimension tables containing detailed information corresponding to the product_id and time_id values, respectively, located in Sales Table 100.

Consider if the following query is placed against Sales Table 100 and Time Table 204:

SELECT Sales.Sales_Amount
FROM Sales, Time
WHERE Sales.time_id=Time.time_id AND Time.quarter='Q1';

This query seeks the Sales Amounts for all entries in the Sales Table 100 in which the sale took place in the first calendar quarter (i.e., "Q1"). To respond to this query, it would be advantageous if Sales Table 100 is partitioned based upon the particular quarter in which a sale was made. With this type of partitioning, the query can be more efficiently optimized by performing a search of only the particular partition having information for the first quarter, and pruning any other partition which does not satisfy this criteria (i.e., pruning partitions corresponding to the second, third, and fourth quarters). However, information relating to the quarter in which sales are made is located in the Time Table 204, rather than in the Sales Table 100.

As noted above, a primary key-foreign key relationship exists between the Sales Table 100 and Time Table 204 on the time_id column (column 130 in Sales Table 100 and column 212 in Time Table 204). According to an embodiment of the present invention, partitioning is performed by controlling the mapping of keys to partitions of a table using the value of keys in another table. In the present example, this can be accomplished by partitioning using primary key-foreign key relationship for the time_id column between the fact table (Sales Table 100) and its dimension table (Time Table 204). Thus, the Sales Table 100 will be partitioned on column time_id, but the partitioning definition will use the Quarter Column 214 in the Time Table 204.

The following SQL-based pseudocode represents possible partitioning criteria that can be used in an embodiment of the invention to perform the desired partitioning of the Sales Table 100 based upon the calendar quarter in which the sale was made:

PARTITION BY LIST (Time.quarter WHERE Sales.time_id=Time.time_id)
(PARTITION p1 Time.quarter IN ('Q1') Tablespace ts1;
PARTITION p2 Time.quarter IN ('Q2') Tablespace ts2;
PARTITION p3 Time.quarter IN ('Q3') Tablespace ts3;
PARTITION p4 Time.quarter IN ('Q4') Tablespace ts4)

In an embodiment of the invention, this partitioning criteria creates join conditions between the Sales Table 100 and the Time Table 204. The join conditions are resolved to perform the necessary lookup to match an entry in the Sales Table 100 with its appropriate partition. This type of lookup determines the appropriate partition for storage when a new data item is inserted into the Sales Table 100. A similar lookup process is utilized to find the appropriate partition if an existing data item is modified or deleted from the Sales Table 100.

Figure 3:
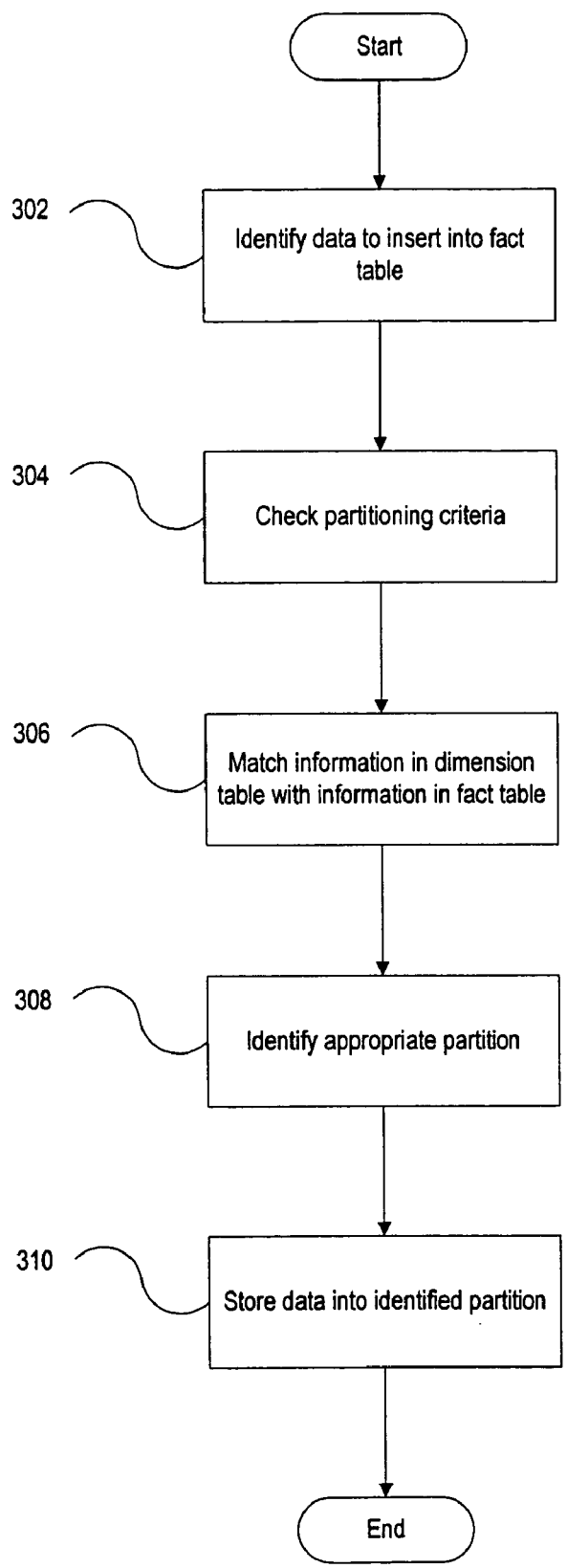
FIG. 3 depicts a process for partitioning according to an embodiment of the invention.

The process flow of FIG. 3 is performed in an embodiment of the invention to insert new data items into a partition of a database table in which the partitioning criteria may be located in another table. At 302, data to be stored in a partitioned table is identified. At 304, the partitioning criteria is checked to determine the specific parameters of the partitioning scheme that is being employed. For example, this action may involve checking for the specific tables/columns referenced in the partitioning criteria.

At 306, the partitioning criteria is used to match information in one or more dimension tables with information to be inserted into the fact table. According to an embodiment, this action involves the resolution of join conditions between two or more columns of the fact table and the dimension table to identify the appropriate partition in which the data item should be stored (308). At 310, the new data item is inserted into the appropriately identified partition.

Figure 4:
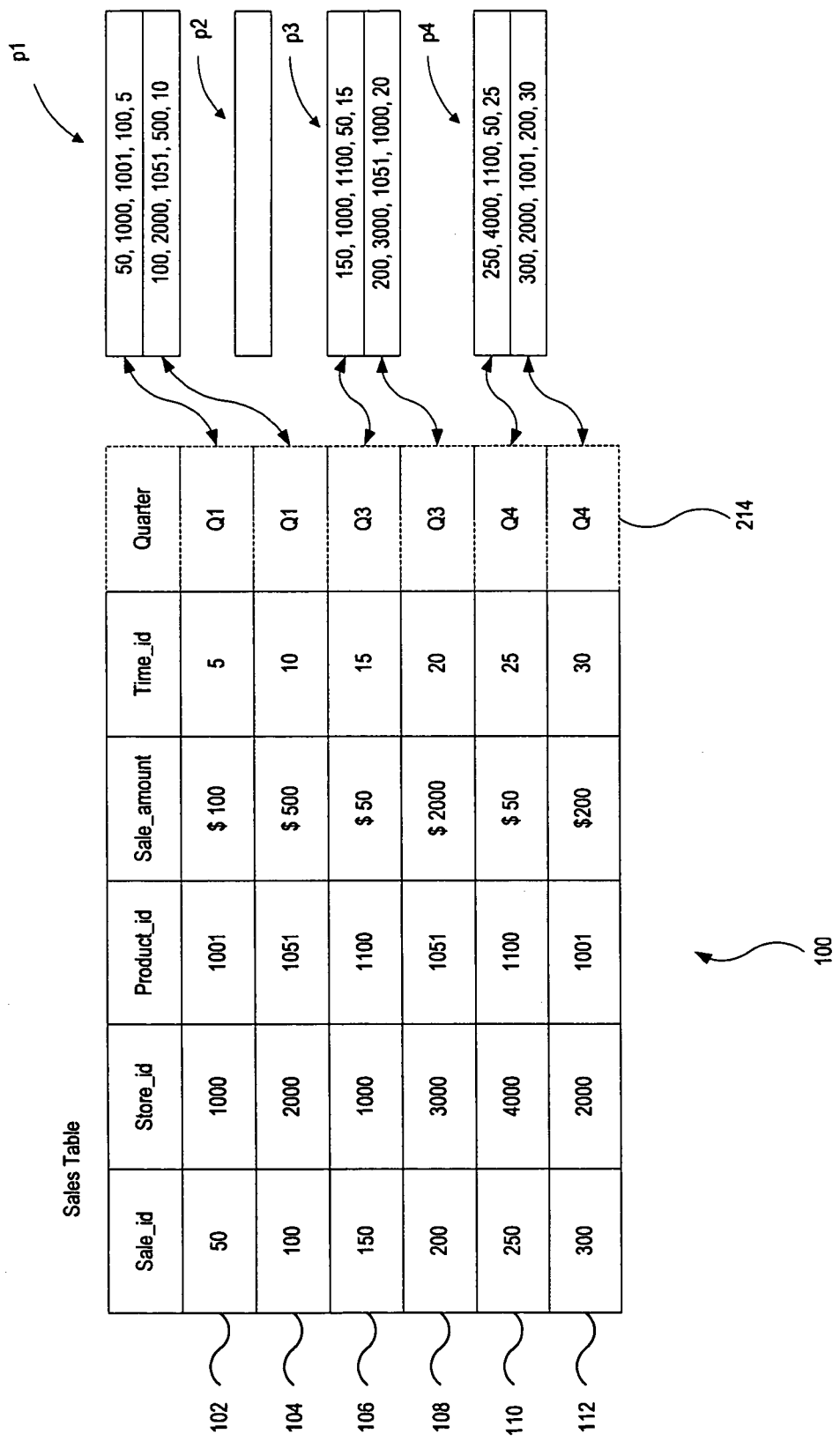
FIG. 4 shows the Sales Table of FIG. 1a partitioned according to information located in a dimension table.

FIG. 4 logically and pictorially represents this process as applied to the partitioning criteria set forth above to partition the Sales Table 100 based upon the calendar quarter in which a sale is made. As each row of the Sales Table 100 is inserted, the time_id value of that row is used to find its matching row in the Time Table 204. This can be accomplished by joining the Sales Table 100 with the Time Table 204 using the time_id column. As shown in FIG. 4, each entry in the Sales Table 100 is matched with its corresponding partition definition column in the Time Table (Quarter Column 214 from Time Table 204—shown outlined with the dashed lines), which allows a determination of the calendar quarter for each row in the Sales Table 100. Thus, it can be seen that rows 102 and 104 belong in the p1 partition, rows 106 and 108 belong in the p3 partition, rows 110 and 112 belong in the p4 partition, and no rows correspond to the p2 partition.

The present invention enables full partition-wise joins between two tables, even if the partitioning definition utilizes a value that does not exists in one of the tables. With reference to the above example, both the Sales Table 100 and the Time Table 204 can be partitioned based upon the value in the Quarter Column 214. The Sales Table 100 is partitioned based upon the foreign key-primary key relationship as set forth above. The Time Table 204 can be directly partitioned based upon values in the Quarter Column 214. If a query calls for a join between these two tables, and the query search term is limited to ranges corresponding to Quarter values, then only the exactly matching partitions of these tables need to be joined to respond to the query. Thus, the Q1 Sales Table partition is directly joined to the Q1 Time Table partition and partitions from both tables for irrelevant calendar quarters are pruned from the search.

The present invention can be employed to partition according to values in multiple dimension tables. Consider if it is desired to partition the Sales Table 100 based upon the values of the quarter in which a sale was made as well as the product category of the product that was sold. As noted above, the "Quarter" attribute values are stored in column 214 of the Time Table 204. The "product_category" attribute values are stored in column 216 of the Product Table 202 (FIG. 2). The following SQL-based pseudocode is an example of a partitioning criteria that can be used:

```
PARTITION BY LIST (Time.quarter, Product.product_category
    WHERE Sales.time_id = Time.time_id
    AND Sales.product_id = Product.product_id)
PARTITION p0 (Time.quarter, Product.product_category) IN
    ('Q1', 'MEMORY') TABLESPACE ts0,
PARTITION p1 (Time.quarter, Product.product_category) IN
    ('Q1', 'MONITOR') TABLESPACE ts1,
PARTITION p2 (Time.quarter, Product.product_category) IN
    ('Q2', 'MEMORY') TABLESPACE ts2,
PARTITION p3 (Time.quarter, Product.product_category) IN
    ('Q2', 'MONITOR') TABLESPACE ts3,
PARTITION p4 (Time.quarter, Product.product_category) IN
    ('Q3', 'MEMORY') TABLESPACE ts4,
PARTITION p5 (Time.quarter, Product.product_category) IN
    ('Q3', 'MONITOR') TABLESPACE ts5,
PARTITION p6 (Time.quarter, Product.product_category) IN
    ('Q4', 'MEMORY') TABLESPACE ts6,
PARTITION p7 (Time.quarter, Product.product_category) IN
    ('Q4', 'MONITOR') TABLESPACE ts7,
)
```

This statement creates a partition p0 for all rows in the Sales Table 100 corresponding to Q1 and the product category "MEMORY"; creates partition P1 for all rows corresponding to Q1 and "MONITOR"; creates a partition P2 for all rows corresponding to Q2 and "MEMORY"; creates partition P3 for rows corresponding to Q2 and "MONITOR"; creates a partition P4 for rows corresponding to Q3 and "MEMORY"; creates partition P5 for all rows corresponding to Q3 and "MONITOR"; creates partition P5 for all rows corresponding to Q4 and "MEMORY"; and creates partition P7 for all rows corresponding to Q4 and "MONITOR".

According to an embodiment of the invention, this partitioning criteria creates join conditions between the Sales Table 100 and both the Product Table 202 and Time Table 204. As with the example shown in FIG. 4, partitioning based upon the Quarter values is performed upon the time_id column 130 of the Sales Table 100, but the partitioning definition will use the Quarter Column 214 of the Time Table 204 when actually performing the partitioning operation. Similarly, partitioning based upon the product_category values is performed upon the product_id column 126 of the Sales Table 100, but the partitioning definition will use the product_category column 216 of the Product Table 202 when performing the partitioning operation.

Figure 5:
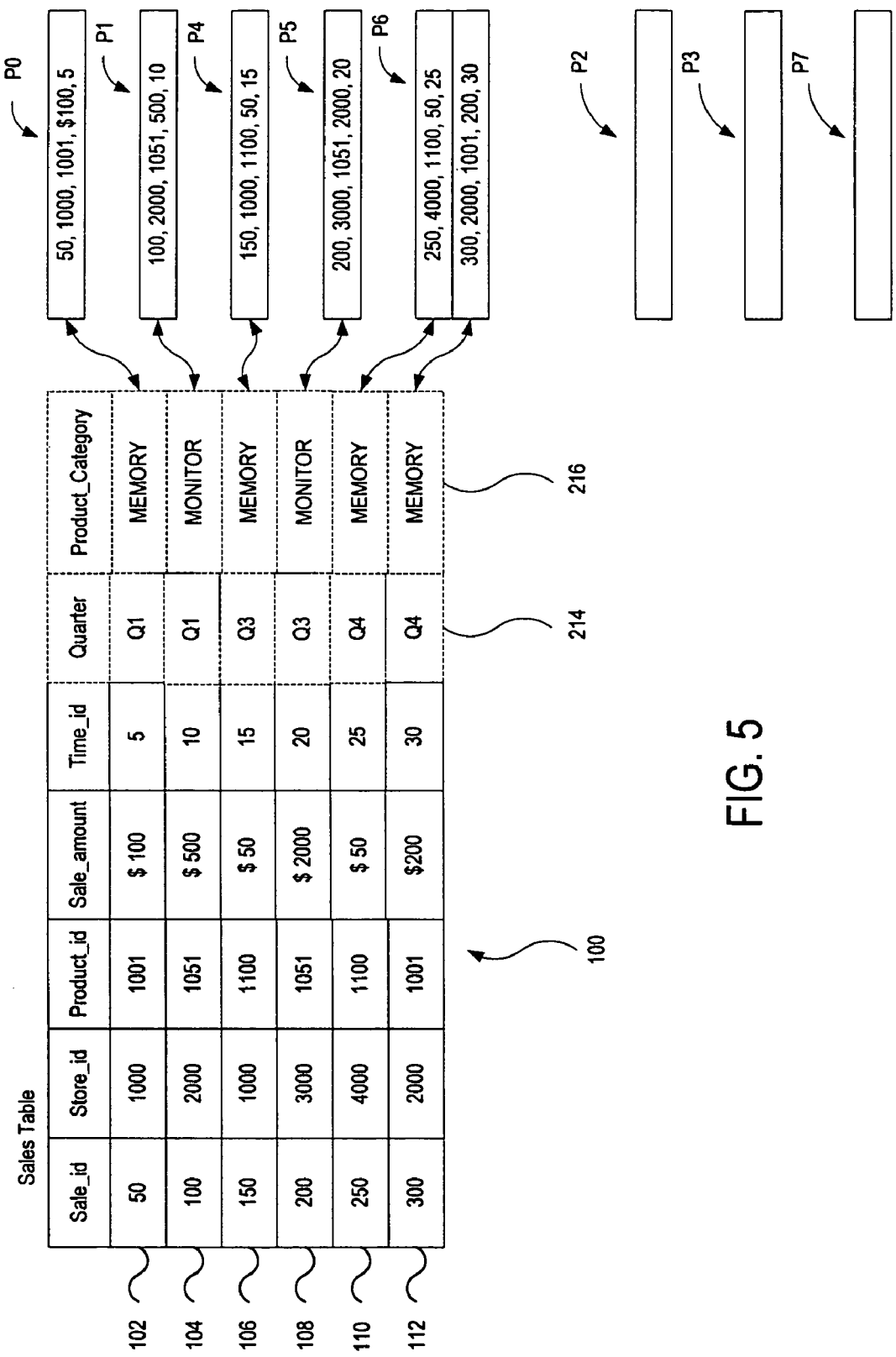
FIG. 5 shows the Sales Table of FIG. 1 partitioned according to information located in multiple dimension tables.

FIG. 5 logically and pictorially represents this process as applied to the partitioning criteria set forth above. As each row of the Sales Table 100 is inserted, the time_id value of that row is used to find its matching row in the Time Table 204. Similarly, the product_id value is used to find its matching row in the Product Table 202. This can be accomplished by joining the Sales Table 100 with the Time Table 204 and Product Table 202 using the time_id column 130 and product_id column 126, respectively. As shown in FIG. 5, each entry in the Sales Table 100 is matched with its corresponding partition definition column in the Time Table and Product Table (Quarter Column 214 from Time Table 204 and Product_category Column 216 from Product Table 202—both shown outlined with the dashed lines). Thus, it can be seen that row 102 belongs in the p0 partition, row 104 belongs in the p1 partition, row 106 belongs in the p4 partition, row 108 belongs in the p5 partition, rows 110 and 112 belong in the p6 partition, and no rows correspond to the p2, p3, and p7 partitions.

Any partitioning model can be utilized in the present invention. Described above were examples of the invention utilized with the "list-based" partitioning model in which rows of a table are mapped to a partition based upon a list of values associated with the partition. An alternative partitioning model is "hash-based" partitioning, in which a value associated with a data record is applied to a hash function to produce a hash value. Separate partitions are established corresponding to different hash values, and data records that hash to a particular value are stored within the partition that is associated with that hash value.

According to the invention, hash-based partitioning can be performed for a data record based upon information associated with that record that is located in another object or table. The following SQL-based pseudocode represents partitioning definition parameters for the tables shown in FIGS. 1-2 for the hash-based partitioning model:

```
PARTITION BY HASH (Time.quarter WHERE
Sales.time_id=Time.time_id)
    PARTITIONS 4
    (PARTITION p1 TABLESPACE ts1,
    PARTITION p2 TABLESPACE ts2,
    PARTITION p3 TABLESPACE ts3,
    PARTITION p4 TABLESPACE ts4)
```

This statement creates four partitions for data in the Sales Table, in which a hash function uses information in the Time.quarter column of the Time table to perform the hashing. According to an embodiment of the invention, a join condition is created between the Time table and the Sales table, at the "time_id" column, to resolve the Time.quarter value for each row in the Sales table. This Time.quarter value is used to hash a row in the fact table to obtain a hash value for partitioning.

Another partitioning model is "range-based" partitioning in which rows of a table map to partitions based upon ranges of column values. Like the other disclosed partitioning models, range partitioning can be employed in the present invention in which partitions are established for ranges of values located in an object or table external to the object being partitioned.

The following SQL-based pseudocode represents partitioning definitions for tables shown in FIGS. 1-2 for the range-based partitioning model:

PARTITION BY RANGE (Time.quarter WHERE Sales.time_id=Time.time_id)
(PARTITION p1 Time.quarter VALUES LESS THAN ('Q2') ts1,
PARTITION p2 Time.quarter VALUES LESS THAN ('Q3') ts2,
PARTITION p3 Time.quarter VALUES LESS THAN ('Q4') ts3,
PARTITION p4 Time.quarter VALUES LESS THAN ('Q5') ts4);

This statement, when defined for sales Table 100, creates four partitions for data in the Sales Table in which data is partitioned based upon ranges of values in the Time.quarter column of the Time Table 204. According to an embodiment of the invention, a join condition is created between the Time Table and the Sales Table to resolve the partition that each row in the Sales Table is assigned to.

The present invention permits composite partitioning of an object based upon information exterior to that object. Composite partitioning, also referred to as multi-dimensional partitioning, is implemented based upon multiple types of partitioning. The following SQL-based pseudocode represents an example of composite partitioning for the tables described above:

PARTITION BY RANGE (Time.quarter WHERE Sales, time_id=Time_time.id)
  SUBPARTITION BY HASH (Product.product_category WHERE Sales.product_id=Product.product_id)
  SUBPARTITIONS 4
  (PARTITION p1 Time.quarter VALUES LESS THAN ('Q2'),
  PARTITION p2 Time.quarter VALUES LESS THAN ('Q3'),
  PARTITION p3 Time.quarter VALUES LESS THAN ('Q4'),
  PARTITION p4 Time.quarter VALUES LESS THAN ('Q5'));

Here, both range-based and hash-based partitioning are employed to partition the Sales table. Range-based partitioning is performed based upon information in the Time.quarter column of the Time table and hash-based subpartitioning of each partition is performed based upon information in the product_category column of the Product table.

According to the invention, a partitioning column could exist in any dimension table in the star schema hierarchy, and is not necessarily required to be in a dimension table directly joined to a fact table. For example, consider the following tables:

Sales (sales_id, store_id, product_id, time_id, sales_amount)
Time (time_id, date, quarter_id)
Quarter (quarter_id, quarter_desc)

In this star schema, quarter_desc is stored in a new table Quarter. If the Sales table is partitioned based upon values in the quarter_desc column, then an extra join is utilized to define partitioning for the Sales table since the Quarter table is indirectly referenced from the Sales table through the Time table. The following is an example partitioning definition for the Sales table based upon data in the Quarter table:

PARTITION BY LIST
(Quarter.quarter_desc WHERE Sales.time_id=Time.time_id AND Time.quarter_id=Quarter.quarter_id)
PARTITION P1 Quarter.quarter_desc IN ('Q1') Tablespace ts1,
PARTITION P2 Quarter.quarter_desc IN ('Q2') Tablespace ts2,
PARTITION P3 Quarter.quarter_desc IN ('Q3') Tablespace ts3,
PARTITION P4 Quarter.quarter_desc IN ('Q4') Tablespace ts4

Here, the partition definitions are based upon a join between the Sales table and the Time table as well as a join between the Time table and Quarter table. Because there is an extra hierarchical "level" between the table being partitioned and the table containing the partitioning column, an extra join operation is required to resolve the partitioning criteria. Each additional hierarchical level adds an additional join operation to the partition definition.

An alternate process for implementing and maintaining partitioning according to the present invention utilizes referential integrity checking mechanisms in a database system. Referential integrity checks are performed to ensure that primary key-foreign key constraints are not violated when inserting, modifying or deleting data into a database system. For example, the Sales fact table 100 has several foreign key columns that reference rows in the dimension tables 200, 202, and 204 using the primary key column of those tables. Referential integrity checks are performed to ensure that only valid foreign key values are inserted in the Sales Table 100; the validity of these foreign key values are verified by checking the valid existence of these values as primary keys in the relevant dimension table. This process of performing a lookup in the dimension table for a valid primary key value can be used to also retrieve an attribute of the row corresponding to that primary key. If the partitioning definition of that data item depends upon one or more of these attributes, then such a referential integrity check can thereby provide the exact partitioning value needed to establish the correct partition for storage of the data item. Similar referential integrity checks can be performed upon the deletion or modification of data items, and thus can also be used to correctly maintain partitions upon the deletion or modification of data from the fact table.

According to an embodiment of the invention, metadata information is maintained for each partitioned object in the database system. The type of information contained in the metadata includes for example, whether an object is partitioned, how many partitions are defined for that object, which partitioning method(s) are employed, what are the partitioning column(s), and what is the partitioning criteria for that object. This metadata information is preferably stored in the data dictionary for the database system. Such metadata information allows the optimizer to recognize the exact relationship, for partitioning purposes, between related tables in the system.

Consistent with an embodiment of the invention, partition pruning is performed by allowing a database query optimizer to access partition definition information during the optimization process.

Figure 6:
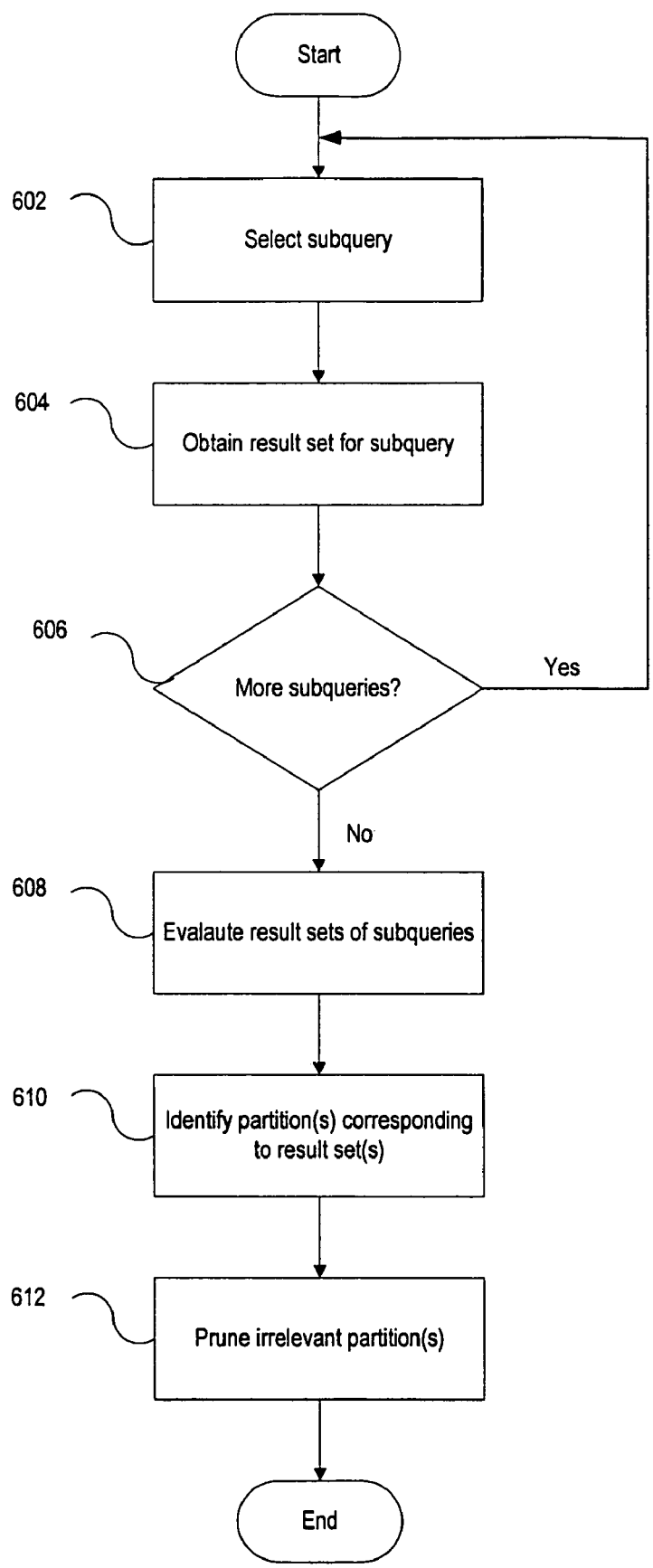
FIG. 6 depicts a process for partition pruning according to an embodiment of the invention.

FIG. 6 depicts a flowchart of a process for partition pruning according to an embodiment of the invention. At compile time, a query is processed by the database optimizer by identifying the tables accessed by the query (602). Once the relevant tables are identified, the optimizer accesses the system metadata to determine whether the table being queried is partitioned, as well as identifying the partition definition for any such partitioned tables (604). The optimizer then determines whether any predicates in the query match against the partitioning definition for the partitioned tables. If the query predicate involves a partitioning column for the relevant table, then this predicate can be used to narrow the list of partitions to be accessed by pruning non-relevant ones. Thus, if the query predicate includes a predicate "Time.quarter=Q1", then only partitions P0 and P1 will be accessed in the example partitioning scheme shown in FIG. 5. Assuming a possible match between query predicate and partition definition, the optimizer will identify whether the query predicate corresponds to less than all of the partitions for the partitioned table (608). If so, then the non-relevant partitions are identified and pruned (610) before executing the query (612). If not, then partition pruning is not performed.

Consider the following query placed against objects having the table/partition definitions shown and utilized with respect to FIGS. 4 and 5:

```
SELECT    Product.product_name, SUM(Sales.sale_amount)
FROM      Sales, Product, Time
WHERE     Sales.time_id = Time.time_id AND Time.Quarter IN ('Q1',
          'Q2')
          AND Sales.product_id = Product.product_id
          AND Product.product_category = 'MEMORY';
```

At compile time, the optimizer accesses metadata in the data dictionary of the database system to determine whether the fact table identified in this query (i.e., the Sales table) is partitioned. Here, the Sales table is partitioned in the examples of both FIG. 4 and FIG. 5. The predicate(s) in the WHERE clause of this query are then matched against the predicates in the partition definitions for the partitioned Sales table.

With respect to the example of FIG. 4, the Sales table is partitioned based upon the value in the Time.Quarter column of the Time table; thus, the predicate in the WHERE clause matches against partitions p1 and p2, which correspond to quarters 'Q1' and 'Q2'. The other partitions (p3 and p4) will therefore be pruned by the optimizer.

With respect to the example of FIG. 5, the Sales table is partitioned based upon values in the Time.Quarter column of the Time table as well as the Product.product_category column of the Product table. The predicate of the WHERE clause in the query therefore matches against the p0 ('Q1'/category 'Memory') and p2 ('Q2'/category 'Memory') partitions. All other partitions can therefore be pruned by the optimizer.

An alternate approach for partition pruning which may be employed with the invention is based upon generating new predicates/subqueries for the search query. Such an approach is described in more detail in co-pending U.S. application Ser. No. 09/795,904, filed on Feb. 27, 2001, which is hereby incorporated by reference in its entirety.

If the query contains a variable or object reference undefined at compile time, then the optimizer performs partition pruning at query execution time when the variable or object reference is provided with a defined value. For example, consider the following query:

```
SELECT    Product.product_name, SUM(Sales.sale_amount)
FROM      Sales, Product, Time
WHERE     Sales.time_id = Time.time_id AND Time.Quarter IN (:b1,
          :b2)
          AND Sales.product_id = Product.product_id
          AND Product.product_category = :b3;
```

':b1', ':b2', and ':b3' are bind variables defined at execution time. Here, the optimizer is unable to perform pruning at compile time because the predicates in the WHERE clause of the query are not yet fully defined. In an embodiment, the partition definition for the table or object being queried is retrieved at compile time and stored or associated with the bind variable. This query definition could be maintained, for example, by a row-source mechanism used in database systems to retrieve rows in response to query execution. At execution time, the bind variable is defined and the row-source mechanism resolves the match between the WHERE clause predicate and the partition definition to identify partitions that can be pruned from the search.

In addition to partition pruning, a partition maintenance operation is another advantageous use of the present invention. For example, assume that it is desired to perform maintenance operations for the Sales Table 100 in which entries are aged out based upon the year of the sales transaction. In the present invention, partitioning the Sales Table 100 by value in the date column of the Time Table 204 allows this to be performed with minimal overhead, since the appropriate partition can be dropped as a unit based upon the date value associated with the partition definitions.

System Architecture Overview

Figure 7:
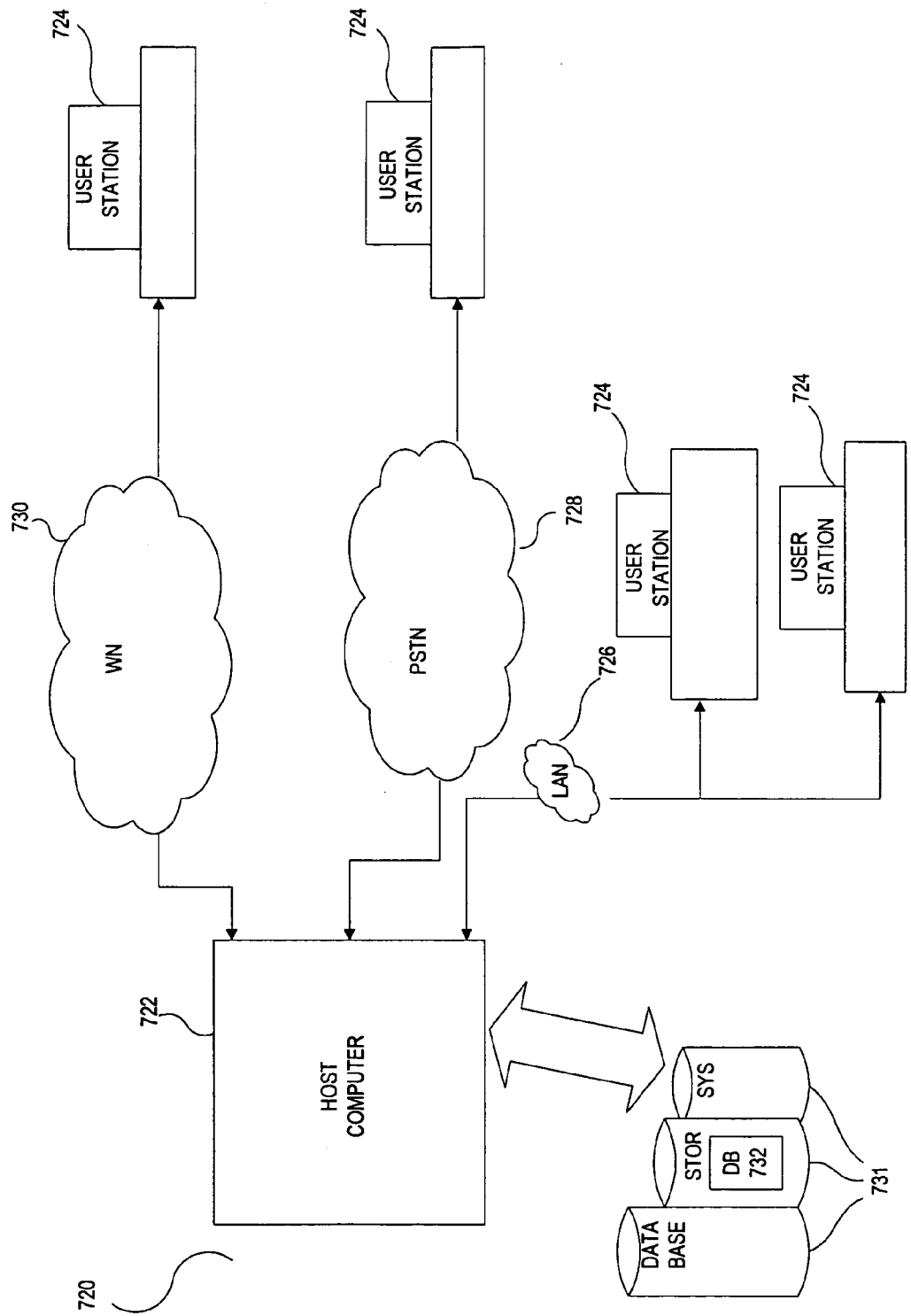
FIG. 7 is a diagram of a system architecture with which the present invention can be implemented.

Referring to FIG. 7, in an embodiment, a computer system 720 includes a host computer 722 connected to a plurality of individual user stations 724. In an embodiment, the user stations 724 each comprise suitable data terminals, for example, but not limited to, e.g., personal computers, portable laptop computers, or personal data assistants ("PDAs"), which can store and independently run one or more applications, i.e., programs. For purposes of illustration, some of the user stations 724 are connected to the host computer 722 via a local area network ("LAN") 726. Other user stations 724 are remotely connected to the host computer 722 via a public telephone switched network ("PSTN") 728 and/or a wireless network 730.

In an embodiment, the host computer 722 operates in conjunction with a data storage system 731, wherein the data storage system 731 contains a database 732 that is readily accessible by the host computer 722. Note that a multiple tier architecture can be employed to connect user stations 724 to a database 732, utilizing for example, a middle application tier (not shown). In alternative embodiments, the database 732 may be resident on the host computer, stored, e.g., in the host computer's ROM, PROM, EPROM, or any other memory chip, and/or its hard disk. In yet alternative embodiments, the database 732 may be read by the host computer 722 from one or more floppy disks, flexible disks, magnetic tapes, any other magnetic medium, CD-ROMs, any other optical medium, punchcards, papertape, or any other physical medium with patterns of holes, or any other medium from which a computer can read. In an alternative embodiment, the host computer 722 can access two or more databases 732, stored in a variety of mediums, as previously discussed.

Figure 8:
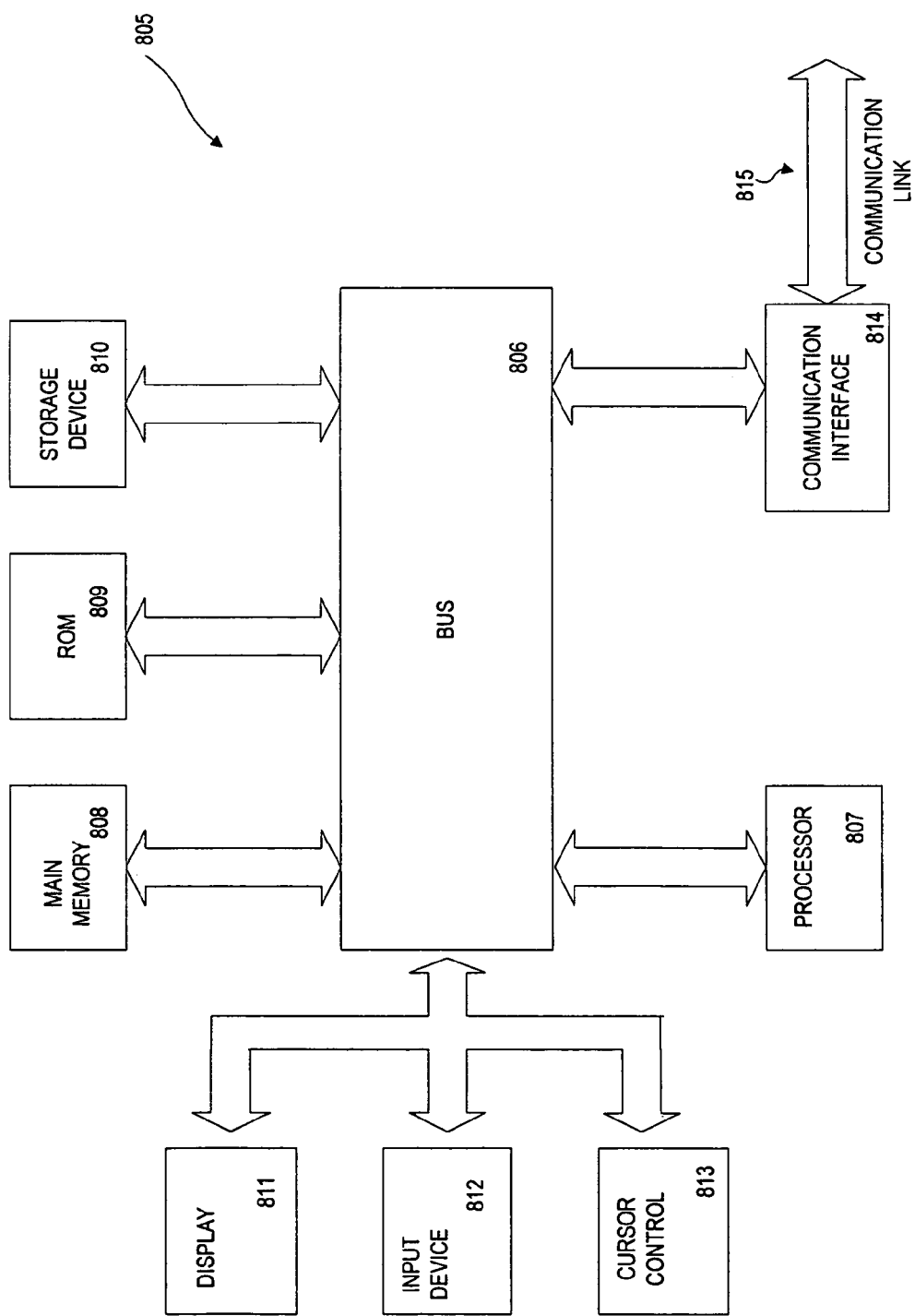
FIG. 8 is an additional diagram of a system architecture with which the present invention can be implemented.

Referring to FIG. 8, in an embodiment, each user station 724 and the host computer 722, each referred to generally as a processing unit, embodies a general architecture 805. A processing unit includes a bus 806 or other communication mechanism for communicating instructions, messages and data, collectively, information, and one or more processors 807 coupled with the bus 806 for processing information. A processing unit also includes a main memory 808, such as a random access memory (RAM) or other dynamic storage device, coupled to the bus 806 for storing dynamic data and instructions to be executed by the processor(s) 807. The main memory 808 also may be used for storing temporary data, i.e., variables, or other intermediate information during execution of instructions by the processor(s) 807. A processing unit may further include a read only memory (ROM) 809 or other static storage device coupled to the bus 806 for storing static data and instructions for the processor(s) 807. A storage device 810, such as a magnetic disk or optical disk may also be provided and coupled to the bus 806 for storing data and instructions for the processor(s) 807.

A processing unit may be coupled via the bus 806 to a display device 811, such as, but not limited to, a cathode ray tube (CRT), for displaying information to a user. An input device 812, including alphanumeric and other keys, is coupled to the bus 806 for communicating information and command selections to the processor(s) 807. Another type of user input device may include a cursor control 813, such as, but not limited to, a mouse, a trackball, a fingerpad, or cursor direction keys, for communicating direction information and command selections to the processor(s) 807 and for controlling cursor movement on the display 811.

According to one embodiment of the invention, the individual processing units perform specific operations by their respective processor(s) 807 executing one or more sequences of one or more instructions contained in the main memory 808. Such instructions may be read into the main memory 808 from another computer-usable medium, such as the ROM 809 or the storage device 810. Execution of the sequences of instructions contained in the main memory 808 causes the processor(s) 807 to perform the processes described herein. In alternative embodiments, hard-wired circuitry may be used in place of or in combination with software instructions to implement the invention. Thus, embodiments of the invention are not limited to any specific hardware, or combination of hardware circuitry and software.

The term "computer-usable medium," as used herein, refers to any medium that provides information or is usable by the processor(s) 807. Such a medium may take many forms, including, but not limited to, non-volatile, volatile and transmission media. Non-volatile media, i.e., media that can retain information in the absence of power, includes the ROM 809. Volatile media, i.e., media that can not retain information in the absence of power, includes the main memory 808. Transmission media includes coaxial cables, copper wire and fiber optics, including the wires that comprise the bus 806. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

Common forms of computer-usable media include, for example: a floppy disk, flexible disk, hard disk, magnetic tape, any other magnetic medium, CD-ROM, any other optical medium, punchcards, papertape, any other physical medium with patterns of holes, RAM, ROM, PROM (i.e., programmable read only memory), EPROM (i.e., erasable programmable read only memory), including FLASH-EPROM, any other memory chip or cartridge, carrier waves, or any other medium from which a processor 807 can retrieve information. Various forms of computer-usable media may be involved in providing one or more sequences of one or more instructions to the processor(s) 807 for execution. The instructions received by the main memory 808 may optionally be stored on the storage device 810, either before or after their execution by the processor(s) 807.

Each processing unit may also include a communication interface 814 coupled to the bus 806. The communication interface 814 provides two-way communication between the respective user stations 824 and the host computer 822. The communication interface 814 of a respective processing unit transmits and receives electrical, electromagnetic or optical signals that include data streams representing various types of information, including instructions, messages and data. A communication link 815 links a respective user station 824 and a host computer 822. The communication link 815 may be a LAN 726, in which case the communication interface 814 may be a LAN card. Alternatively, the communication link 815 may be a PSTN 728, in which case the communication interface 814 may be an integrated services digital network (ISDN) card or a modem. Also, as a further alternative, the communication link 815 may be a wireless network 730. A processing unit may transmit and receive messages, data, and instructions, including program, i.e., application, code, through its respective communication link 815 and communication interface 814. Received program code may be executed by the respective processor(s) 807 as it is received, and/or stored in the storage device 810, or other associated non-volatile media, for later execution. In this manner, a processing unit may receive messages, data and/or program code in the form of a carrier wave.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. For example, note that the above process, while described with specific reference to relational database tables, can be equally applied to other objects in the database system, such as partitioned indexes, or even to objects outside of a relational database system, such as object-based database objects. The specification and drawings are, accordingly, to be regarded in an illustrative rather than restrictive sense.

We claim:

1. A method of executing a query against a first database object that is partitioned using a partition definition based upon information located in a second database object, comprising:

accessing metadata comprising the partition definition;
using the partition definition and a predicate in the query to determine a set of one or more partitions for the first database object, the one or more partitions for the first database object being based upon information located in the second database object, wherein the second database object comprises a dimension table with a row that corresponds to a data item in the first database object, the row of the dimension table providing detailed information relevant to the data item in the first database object, and wherein a part of the detailed information comprises the information for the partition of the first database object wherein the metadata is accessed from a data dictionary that is different from the second database object; and pruning from the set of the one or more partitions one or more partitions that are not relevant to the query, wherein the act of pruning is performed at compile time or at execution time for the query.

2. The method of claim 1 in which the act of pruning is performed at compile time for the query.

3. The method of claim 1 in which the query contains one or more bind variables, and the act of pruning is performed after values are determined for the one or more bind variables.

4. The method of claim 1, wherein at least one hierarchical level exists between the first database object and the second database object, the information in the second database object being indirectly referenced through the at least one hierarchical level.

5. The method of claim 1, where the partition definition and another partition definition are based on information located in a third database object.

6. A computer program product that includes a volatile or non-volatile medium usable by a processor, the medium having stored thereon a sequence of instructions which, when executed by said processor, causes said processor to execute a process for executing a query against a first database object that is partitioned using a partition definition based upon information located in a second database object, said process comprising:

accessing metadata comprising the partition definition;

using the partition definition and a predicate in the query to determine a set of one or more partitions for the first database object, the one or more partitions for the first database object being based upon information located in the second database object, wherein the second database object comprises a dimension table with a row that corresponds to a data item in the first database object, the row of the dimension table providing detailed information relevant to the data item in the first database object, and wherein a part of the detailed information comprises the information for the partition of the first database object, wherein the metadata is accessed from a data dictionary that is different from the second database object; and pruning from the set of the one or more partitions one or more partitions that are not relevant to the query, wherein the act of pruning is performed at compile time or at execution time for the query.

7. The computer program product of claim 6 in which the act of pruning is performed at compile time for the query.

8. The computer program product of claim 6 in which the query contains one or more bind variables, and the act of pruning is after values are determined for the one or more bind variables.

9. The computer program of claim 6, wherein at least one hierarchical level exists between the first database object and the second database object, the information in the second database object being indirectly referenced through the at least one hierarchical level.

10. The computer program of claim 6, where the partition definition and another partition definition are based on information located in a third database object.

11. A computer-implemented system for executing a query against a first database object that is partitioned using a partition definition based upon information located in a second database object, the system comprising:

means for accessing metadata comprising the partition definition;

means for using the partition definition and a predicate in the query to determine a set of one or more partitions for the first database object, the one or more partitions for the first database object being based upon information located in the second database object, wherein the second database object comprises a dimension table with a row that corresponds to a data item in the first database object, the row of the dimension table providing detailed information relevant to the data item in the first database object, and wherein a part of the detailed information comprises the information for the partition of the first database object wherein the metadata is accessed from a data dictionary that is different from the second database object; and means for pruning from the set of the one or more partitions one or more partitions that are not relevant to the query, wherein the act of pruning is performed at compile time or at execution time for the query.

12. The system of claim 11 in which pruning is performed at compile time for the query.

13. The system of claim 11 in which the query contains one or more bind variables and pruning is performed after values are determined for the one or more bind variables.

14. The system of claim 11, where the partition definition and another partition definition are based on information located in a third database object.

15. The method of claim 1, wherein the detailed information in the second database object comprises data not in the first database object.

16. The computer program product of claim 6, wherein the detailed information in the second database object comprises data not in the first database object.

17. The system of claim 11, wherein the detailed information in the second database object comprises data not in the first database object.

18. The method of claim 1, wherein the first database object is also partitioned based upon information located in a third database object, and the third database object comprises an additional dimension table with a row that corresponds to the data item in the first database object, the row of the additional dimension table providing additional detailed information relevant to the data item in the first database object.

19. The method of claim 18, wherein a part of the additional detailed information is used for partitioning the first database object.

20. The method of claim 1, wherein the detailed information comprises a query result for a query that is executed against the first database object.

21. The computer program product of claim 6, wherein the first database object is also partitioned based upon information located in a third database object, and the third database object comprises an additional dimension table with a row that corresponds to the data item in the first database object, the row of the additional dimension table providing additional detailed information relevant to the data item in the first database object.

22. The computer program product of claim 21, wherein a part of the additional detailed information is used for partitioning the first database object.

23. The computer program product of claim 6, wherein the detailed information comprises a query result for a query that is executed against the first database object.

24. The system of claim 11, further comprising means for partitioning the first database object based upon information located in a third database object, the third database object comprises an additional dimension table with a row that corresponds to the data item in the first database object, the row of the additional dimension table providing additional detailed information relevant to the data item in the first database object.

25. The system of claim 24, further comprising means for using a part of the additional detailed information for partitioning the first database object.

26. The system of claim 24, wherein the detailed information comprises a query result for a query that is executed against the first database object.

* * * * *

UNITED STATES PATENT AND TRADEMARK OFFICE
CERTIFICATE OF CORRECTION

| | | |
|---|---|---|
| PATENT NO. | : 7,680,761 B2 | Page 1 of 1 |
| APPLICATION NO. | : 10/952390 | |
| DATED | : March 16, 2010 | |
| INVENTOR(S) | : Mohamed Zait et al. | |

It is certified that error appears in the above-identified patent and that said Letters Patent is hereby corrected as shown below:

Drawings
On Sheet 3 of 9, in Figure 2, in Box 216, line 1, delete "Product_catetory" and insert -- Product_category --, therefor.

On Sheet 7 of 9, in Figure 6, in Box 608, line 1, delete "Evalaute" and insert -- Evaluate --, therefor.

In column 11, line 24, after "disk" insert -- , -- (second occurrence).

In column 13, line 10, in Claim 1, after "object" insert -- , --.

In column 13, line 63, in Claim 9, after "program" insert -- product --.

In column 14, line 1, in Claim 10, after "program" insert -- product --.

In column 14, line 22, in Claim 11, after "object" insert -- , --.

Signed and Sealed this

Twenty-eighth Day of September, 2010

David J. Kappos
*Director of the United States Patent and Trademark Office*